(12) United States Patent
Delo

(10) Patent No.: US 6,714,935 B1
(45) Date of Patent: Mar. 30, 2004

(54) MANAGEMENT OF NON-PERSISTENT DATA IN A PERSISTENT DATABASE

(75) Inventor: John C. Delo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,883

(22) Filed: Sep. 21, 1998

(51) Int. Cl.$^7$ ................................................ G06F 7/00
(52) U.S. Cl. ........................... 707/101; 707/2; 707/3; 707/102
(58) Field of Search ...................... 707/1, 4, 10, 100, 707/102, 201, 103, 101; 395/712; 717/12, 11; 364/300

(56) References Cited

U.S. PATENT DOCUMENTS

| | | | | |
|---|---|---|---|---|
| 4,769,772 A | * | 9/1988 | Dwyer | 364/300 |
| 5,280,610 A | * | 1/1994 | Travis, Jr. et al. | 707/102 |
| 5,701,461 A | * | 12/1997 | Dalal et al. | 707/4 |
| 5,717,924 A | * | 2/1998 | Kawai | 707/102 |
| 5,724,575 A | * | 3/1998 | Hoover et al. | 707/10 |
| 5,758,337 A | * | 5/1998 | Hammond | 707/6 |
| 5,765,147 A | * | 6/1998 | Mattos et al. | 707/4 |
| 5,794,030 A | * | 8/1998 | Morsi et al. | 707/103 R |
| 5,799,310 A | * | 8/1998 | Anderson et al. | 707/102 |
| 5,819,251 A | * | 10/1998 | Kremer et al. | 707/1 |
| 5,870,611 A | * | 2/1999 | London Shrader et al. | 395/712 |
| 5,930,779 A | * | 7/1999 | Knoblock et al. | 707/503 |
| 5,930,795 A | * | 7/1999 | Chen et al. | 707/100 |
| 5,933,647 A | * | 8/1999 | Aronberg et al. | 717/178 |
| 5,937,402 A | * | 8/1999 | Pandit | 707/4 |
| 5,937,435 A | * | 8/1999 | Dobbek et al. | 711/202 |
| 6,006,224 A | * | 12/1999 | McComb et al. | 707/5 |
| 6,016,497 A | * | 1/2000 | Suver | 707/103 |
| 6,016,553 A | * | 1/2000 | Schneider et al. | 714/21 |
| 6,049,807 A | * | 4/2000 | Carroll et al. | 707/201 |
| 6,058,389 A | * | 5/2000 | Chandra et al. | 707/1 |
| 6,076,090 A | * | 6/2000 | Burroughs et al. | 707/102 |
| 6,085,198 A | * | 7/2000 | Skinner et al. | 707/103 |
| 6,112,199 A | * | 8/2000 | Nelson | 707/4 |
| 6,115,715 A | * | 9/2000 | Traversat et al. | 707/100 |

(List continued on next page.)

OTHER PUBLICATIONS

"Language Constructs for Persistent Object based programming"—A. S. M. Sajeev—1988—IEEE (pps: 251–255).*

"Beyond Schema Evalution to database Reorganization"—Barbara Staudt Lerner—1990 ACM—Oct. 21–25, 1990 .(pps: 67–76).*

"eNVy: A Non–Volatile, Main Memory Storage System"—Michael Wu and Willy Zwaenepoel—1994 ACM—(pps: 86–97).*

"Operating System Support for Persistent and Recoverable Computations"—John Rosenberg, Alan Dearle, David Hulse, Ande Lindstrom & Stephen Norris—Sep. 1996, vol. 39, No. 9, Communications of The ACM—(pps: 62–69).*

*Primary Examiner*—Alford Kindred
*Assistant Examiner*—Anh Ly
(74) *Attorney, Agent, or Firm*—Christensen O'Connor Johnson Kindness PLLC

(57) ABSTRACT

A method of managing non-persistent data in a persistent database includes adding the non-persistent data to the database in the form of a temporary entry. The temporary entry can be a temporary row or column, a temporary table or a temporary database with temporary tables. The method also includes tracking the non-persistent data in order to maintain the original state of the persistent database. A column of temporary bits is added to track the rows, and the temporary columns are tracked via a bit in the schema. Non-persistent temporary entries can be added to any relational database to manipulate data while maintaining the original state of the database. Using temporary entries is advantageous when a large amount of data already exists in a database and a user needs to enhance and/or manipulate the data while still retaining the original state of the data.

29 Claims, 4 Drawing Sheets

U.S. PATENT DOCUMENTS

| | | | | |
|---|---|---|---|---|
| 6,119,129 A | * | 9/2000 | Traversat et al. | 707/202 |
| 6,128,771 A | * | 10/2000 | Tock et al. | 707/1 |
| 6,151,608 A | * | 11/2000 | Abrams | 707/204 |
| 6,151,702 A | * | 11/2000 | Overturf et al. | 717/136 |
| 6,158,001 A | * | 12/2000 | Lee et al. | 713/1 |
| 6,237,144 B1 | * | 5/2001 | Delo | 717/11 |
| 6,341,288 B1 | * | 1/2002 | Yach et al. | 707/103 R |
| 6,378,127 B1 | * | 4/2002 | Delo | 717/11 |
| 6,421,711 B1 | * | 7/2002 | Blumenau et al. | 709/213 |
| 6,499,036 B1 | * | 12/2002 | Gurevich | 707/103 R |
| 6,542,899 B1 | * | 4/2003 | Saulpaugh et al. | 707/103 R |

* cited by examiner

MANAGEMENT OF NON-PERSISTENT DATA IN A PERSISTENT DATABASE

RELATED APPLICATIONS

This application is related to the following applications, all of which are filed on the same day and assigned to the same assignee as the present application:

"Use of Relational Databases for Software Installation"—Ser. No. 09/158,125.

"System and Method for Repairing a Damaged Application" —Ser. No. 09/158,126.

"Method and System for Restoring a Computer to its Original State After an Unsuccessful Installation Attempt" —Ser. No. 09/158,124.

"A Method for Categorizing and Installing Selected Software Components"—Ser. No. 09/157,695.

"System and Method for Managing Locations of Software Components Via A Source List"—Ser. No. 09/157,974.

"Method for Optimizing the Installation of a Software product onto a Target Computer System"—Ser. No. 09/157,853.

"Software Installation and Validation Using Custom Actions"—Ser. No. 09/157,776.

"Internal Database Validation"—Ser. No. 09/157,828.

"Method and System for Advertising Applications"—Ser. No. 09/158,125.

"Software Implementation Installer Mechanism"—Ser. No. 09/158,021.

FIELD OF THE INVENTION

This invention relates generally to databases, and more particularly to management of non-persistent data in a persistent database.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings attached hereto: Copyright© 1998, Microsoft Corporation, All Rights Reserved.

BACKGROUND OF THE INVENTION

A prevalent type of database today is a relational database. A relational database is a collection of data items organized as a set of formally-described tables from which data can be accessed in many different ways without having to reorganize the database tables. A view is a particular way of accessing the data items in a database. A single database can support numerous different views. Typically, a view arranges the data in some order and makes only certain components of the data visible. The different views do not affect the physical organization of the database tables.

Each table (also referred to as a relation) contains one or more data categories organized in columns. The names of the columns of the table are referred to as attributes. A row of a table contains a unique instance of data for the categories defined by the columns. Each row has one component for each attribute of the table. The name of the table and the set of attributes for the table are together referred to as the schema for that particular table.

Although the rows of a table are frequently modified, it is less common for the schema of a table to change. However, there are situations where a user might want to add or delete attributes. Schema changes, while possible in commercial database systems, are very expensive and inefficient because each one of the perhaps millions of rows need to be rewritten to add or delete components. If an attribute is added, for example, it may be difficult or even impossible to find the correct value for the new component of the rows.

When a database is extended to include additional data such as new rows or columns, the additional data becomes a permanent part of the database. However, a user often does not want to modify the data permanently. For example, in some cases it is desirable to enhance or manipulate large amounts of data that already exists in a database while retaining the original state of the database. One method of enhancing and manipulating data without changing the original state of a database is to store the new data separate from the original data. For example, new data is stored in a separate table. However, performance suffers when this method is used. More time and system resources are required to access and manipulate data stored in multiple locations than if the data were integrated and stored in the same location.

Therefore, a database system is needed which permits new data to be added to a table without requiring that the original state of the table be modified. What is also needed is a database system that permits the new data to be seamlessly integrated with the original data for manipulation.

SUMMARY OF THE INVENTION

The above-mentioned shortcomings, disadvantages and problems are addressed by the present invention, which will be understood by reading and studying the following specification. This invention relates to management of non-persistent data in a persistent database.

A method of managing non-persistent data in a persistent database includes adding the non-persistent data to the database in the form of a temporary entry. The temporary entry can be a temporary row or column, a temporary table or a temporary database with temporary tables. The method also includes tracking the non-persistent data in order to maintain the original state of the persistent database. A column of temporary bits is added to track the rows, and the temporary columns are tracked via a bit in the schema.

A computerized system for managing non-persistent data in a persistent database includes a database containing persistent data and a database engine for maintaining the relational database. A database application program interface has special options for adding an entry containing non-persistent data to the relational database. The database engine integrates the non-persistent data into the relational database with the persistent data while the database exists in memory of a computer. The database engine ignores the non-persistent data in the relational database when writing the relational database to a computer readable medium so that an original state of the persistent data is preserved.

Non-persistent temporary entries can be added to any relational database to extend data while maintaining the original state of the database. Using temporary entries is advantageous when a large amount of data already exists in a database and a user needs to enhance and/or manipulate the data while still retaining the original or updated state of the data.

The present invention describes systems, methods, computers and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular implementation of the invention is described that operates as part of Microsoft Corporation's Windows Installer product. Finally, in the fifth section, a conclusion of the detailed description is provided.

Hardware and Operating Environment

Figure 1:
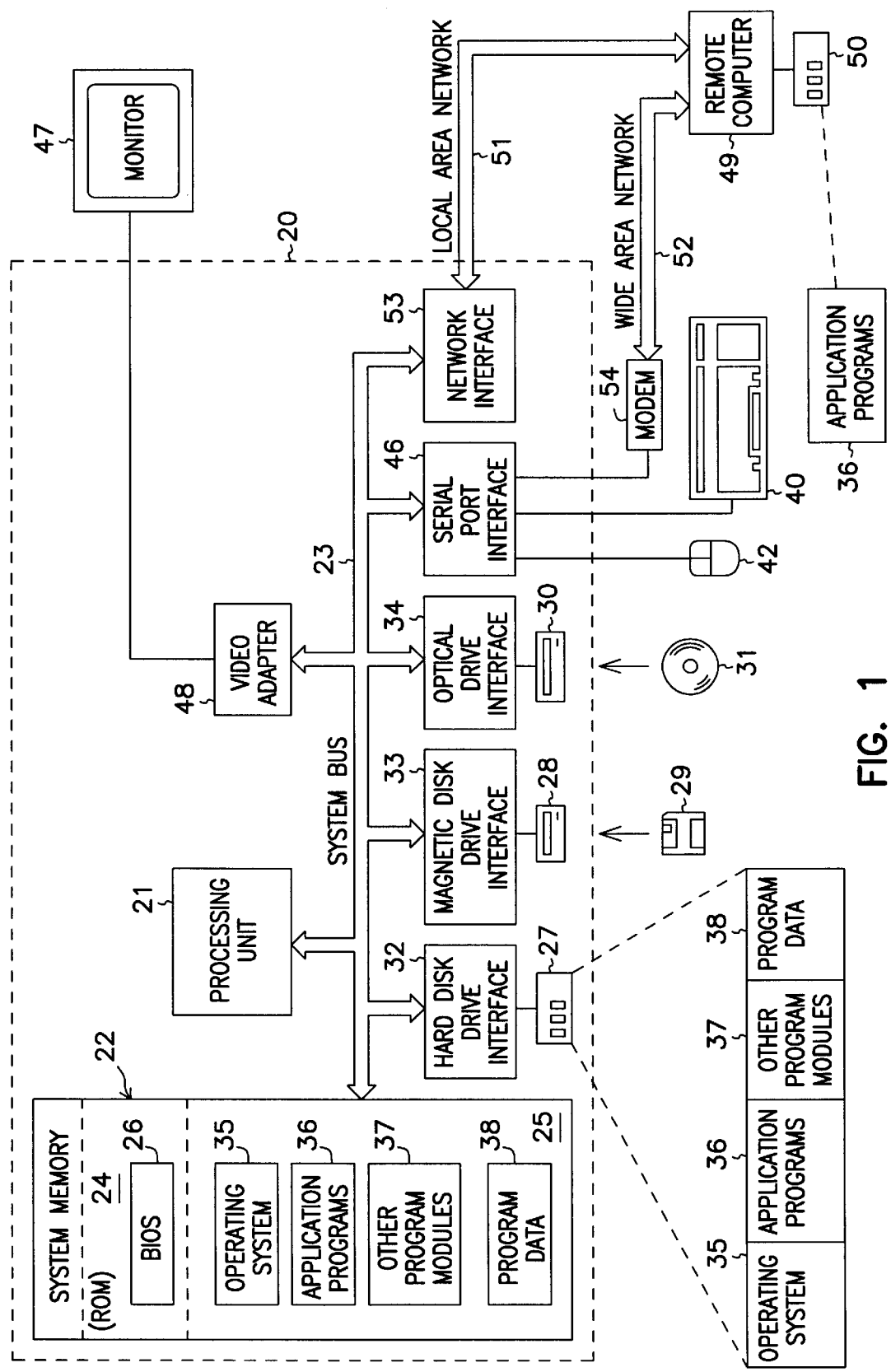
FIG. 1 is a block diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25, a basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
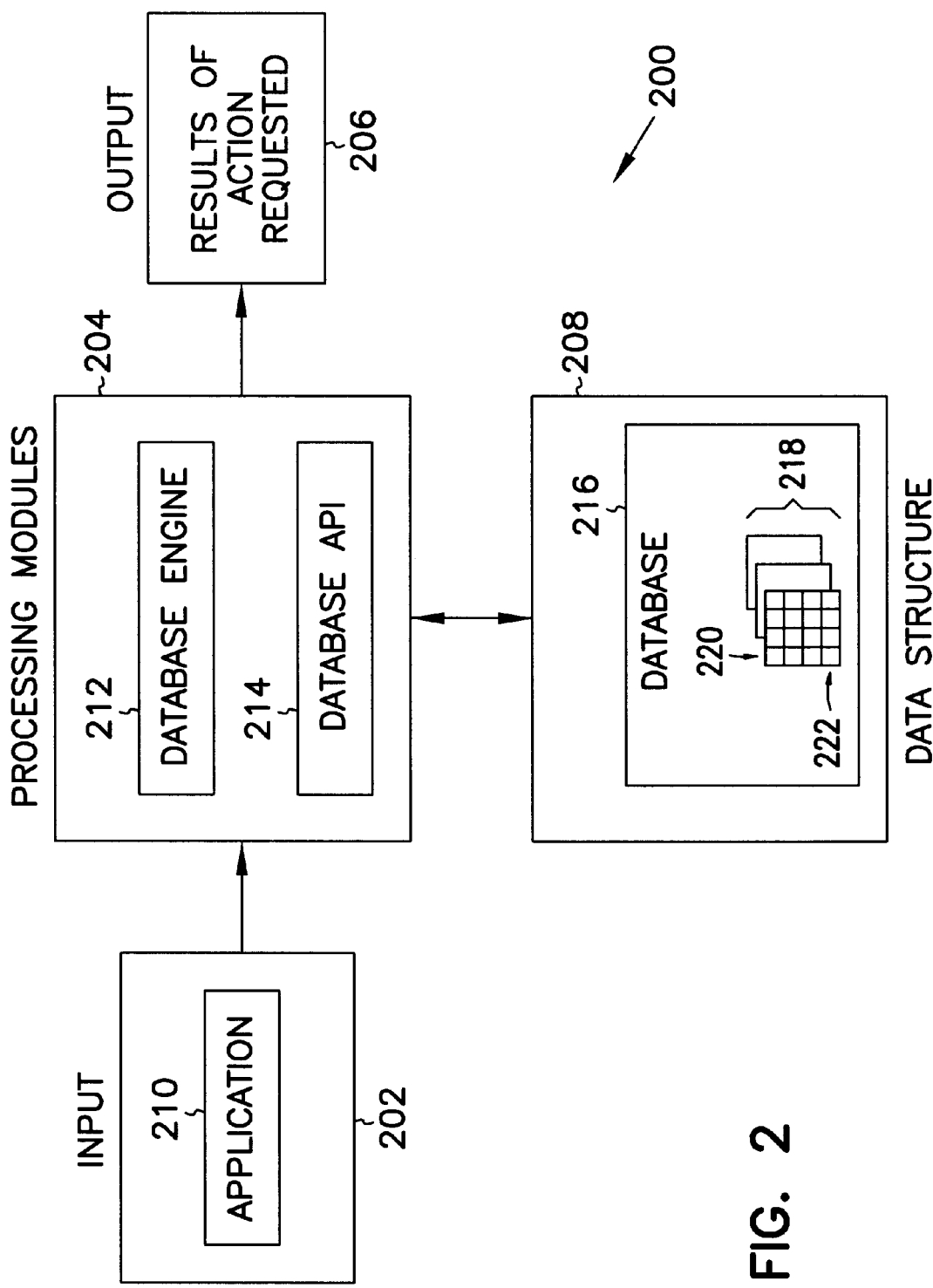
FIG. 2 is a block diagram illustrating a system-level overview of an exemplary embodiment of the invention.

A system level overview of the operation of an exemplary embodiment of the invention is described by reference to FIG. 2. As shown in FIG. 2, a non-persistent data management system 200 comprises one or more inputs 202, one or more processing modules 204, one or more outputs 206, and one or more data structures 208.

The inputs 202 to the non-persistent data management system 200 represent requests from a database client application 210 to enhance or manipulate persistent data. In an example embodiment of the invention further described in the section entitled "Microsoft Windows Installer Implementation," the application 210 is a software installation application designed to provide a robust and easy to use interface for installing software applications from an installation medium to a user's computer system. In one embodiment, the software installation application requests that temporary columns be added to data tables in a software installation database. The temporary columns represent a current state of a computer before and during the installation process as well as a desired state of the computer upon completion of the installation process. The outputs 206 of the non-persistent data management system represent the results of the requests from the database client application 210.

Processing modules 204 comprise program modules that perform actions requested by the application 210. Generally, program modules include routines, programs, objects, components, data structures, etc., that perform particular functions or implement particular abstract data types. In one embodiment, processing modules 204 comprise database engine 212 and database application program interface (API) 214.

Database engine 212 is a computer program responsible for maintaining a database. Database engine 212 is an interface between client applications, such as application 210, and the database. Database engine 212 performs various operations such as reading data from the database in response to application program queries and writing data to the database when an application program inserts, deletes, or updates a row or a column in the database. In the non-persistent data management system 200 of the present invention, both non-persistent data and persistent data are written to and read from a database by database engine 212.

Database API 214 is an application program interface used by a database client application. The API defines the interface between a database client and the database engine 212. Typically, database API 214 is a set of function calls allowing a database client to create a database table; insert, update and delete rows within a table; query for rows in a table meeting certain criteria; and read data from rows in a table. In one embodiment of the non-persistent data management system 200 of the present invention, database API 214 provides one or more calls for adding temporary entries to database tables. In an alternate embodiment, temporary entries are added to database tables with SQL (Structured Query Language) statements specifying the keyword "TEMPORARY." Data structures 208 comprise one or more databases, such as database 216. Database 216 is a conventional relational database. Database 216 contains a plurality of data tables 218. Each one of the data tables 218 has one or more columns 220 having a defined data type such as integer, real, string, or binary data. Each one of the data tables 218 also has one or more rows 222. The data tables 218 are typically used to hold application specific data. In one embodiment of the invention further described in the section entitled "Microsoft Windows Installer Implementation," database 216 is a database containing software application installation data such as file names, directory names, registry keys and identifiers.

In the non-persistent data management system 200 of the present invention, data tables 218 integrate rows and columns of persistent and non-persistent data. Non-persistent data is also referred to as temporary data or temporary entries. The temporary data is integrated with the persistent data in at least one data table 218 of the database 216 while the data table 218 exists in memory of a computer such as local computer 20 of FIG. 1. When the data table 218 is removed from memory and written to permanent storage on another form of computer readable media, the rows and columns containing temporary data are ignored. That is, the rows and columns containing temporary data are not written to the permanent storage; only the persistent data is written. In one embodiment, the temporary data exists in a table of the database loaded in memory only as long as the table is referenced by any views associated with the table. As a result, new data can be added to a database for manipulation while the original schema of the database is maintained.

The system level overview of the operation of an exemplary embodiment of the invention has been described in this section of the detailed description. The nonpersistent data management system 200 of the present invention permits new data to be added to a database in the form of temporary entries to a data table without requiring that the original state of the table be modified.

Methods of an Exemplary Embodiment of the Invention

In this section, the particular methods performed by a computer, such as local computer 20 of FIG. 1, in an exemplary embodiment are described by reference to a flowchart. The methods to be performed constitute computer programs made up of computer-executable instructions. Describing the methods by reference to a flowchart enables one skilled in the art to develop such programs including such instructions to carry out the methods on suitable computerized systems (the processor of the computer executing the instructions from a computer-readable media).

Figure 3:
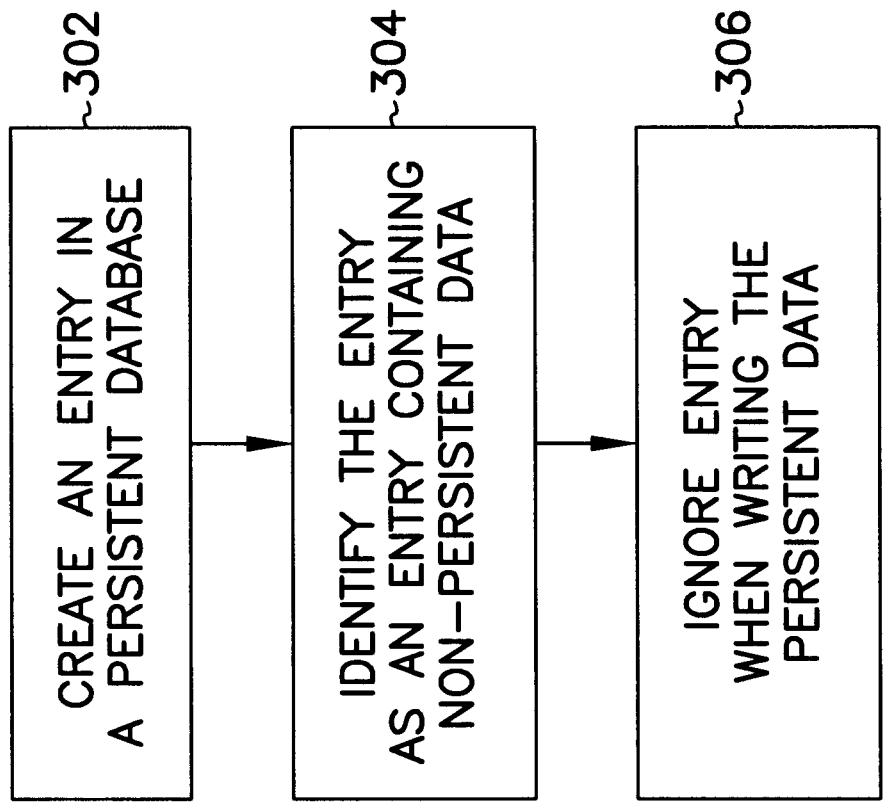
FIG. 3 is a flowchart of a method to be performed by a computer according to an exemplary embodiment of the invention.

FIG. 3 is a high level flowchart of methods to be performed by a computer according to an exemplary embodiment of the invention. This flow chart indicates the acts to be performed by the non-persistent data management system in order to manage non-persistent data in a persistent database. In the example embodiment shown in FIG. 3, the non-persistent data management system creates an entry in a persistent database (block 302). The non-persistent data management system identifies the entry as a entry containing non-persistent data (block 304). The non-persistent data management system ignores the entry when writing the persistent database to a computer readable medium so that an original state of the persistent database is preserved (block 306). Each one of the acts shown in FIG. 3 is now described in further detail.

As shown in block 302 of FIG. 3, the non-persistent data management system creates an entry in a persistent database loaded in memory of a computer. The entry can be a temporary row or a temporary column, a temporary table or a temporary database in which all tables are temporary. In one embodiment, the temporary entry is created with a query language such as SQL (Structured Query Language). According to one embodiment of the present invention, common SQL statements such as "CREATE TABLE," "ALTER TABLE," and "INSERT INTO" accept a new keyword "TEMPORARY." The keyword "TEMPORARY" designates that the added row or column is not to be persisted. Additionally, common SQL statements such as "ALTER TABLE" and "CREATE TABLE" accept a new keyword "HOLD." The keyword "HOLD" keeps the temporary data present in memory beyond the lifetime of one or more views associated with the table (otherwise the temporary data is destroyed when the table is no longer reference by any view). Common SQL statements such as "ALTER TABLE" also accept a new keyword "FREE." The keyword "FREE" negates the effect of the "HOLD" keyword, and thus allows the release the temporary data from memory.

In an alternate embodiment, the temporary entry is created in response to an API call on a view. In one embodiment, temporary rows or columns are added via a view opened on a particular table. In an example embodiment, an API call "MsiViewModify" accepts a data record along with an enumeration value that denotes the operation to be performed on the data record. The enumeration value is an enumerated data type indicating the type of operation to be performed. For example, an "INSERT" operation inserts a persistent row or column. An "INSERT_TEMPORARY" operation inserts a non-persistent row or column.

In addition to temporary rows and temporary columns or attributes, the nonpersistent data management system of the present invention creates temporary tables and temporary databases. A temporary table is simply a table that has no persistent attributes; i.e. all columns are created with the "TEMPORARY" keyword specified. A temporary database is one that has no persistent location specified, thus all data is temporary by default.

Figure 4:
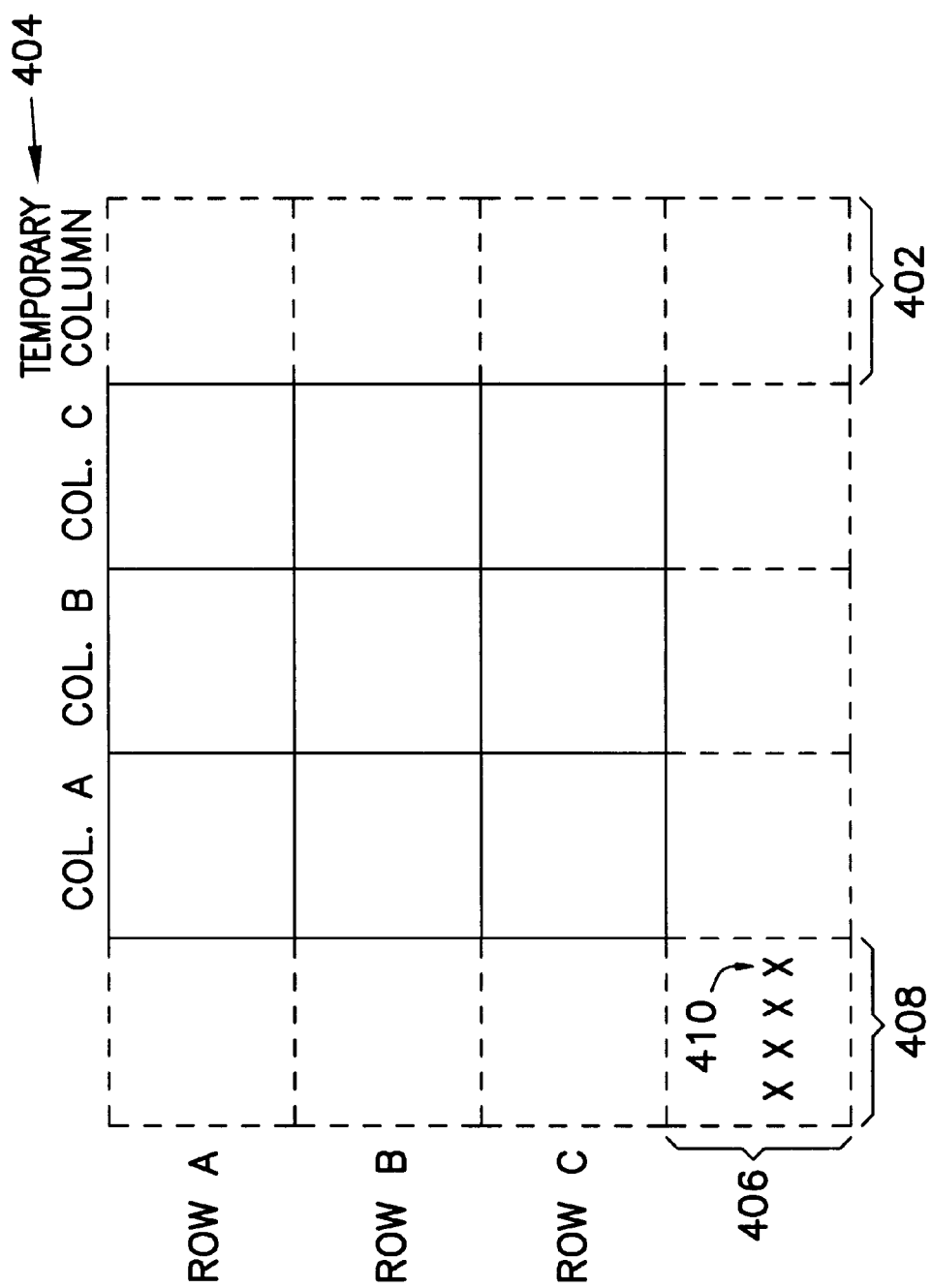
FIG. 4 is a diagram of an example data table integrating rows and columns of persistent and non-persistent data.

As shown in block 304 of FIG. 3, the non-persistent data management system identifies the temporary entry as an entry containing non-persistent data. In an example embodiment shown in FIG. 4, a column 402 containing non-persistent data is identified by an attribute 404 ("Temporary Column") in the description of the column. Likewise, a bit in the schema for the table is set to identify the column containing non-persistent data. In another embodiment, a row 406 containing non-persistent data is identified using a reserved column 408 in the table. The reserved column contains data for each row including a flag bit 410, or an attribute bit, used to identify a row containing nonpersistent data.

Referring back to block 306 of FIG. 3, the non-persistent data management system ignores the entry in the database when writing the persistent database to a computer readable medium so that an original state of the persistent database is preserved. When saving the persistent data (i.e. commit), the row attribute bits and the column attributes are used to identify rows and columns containing non-persistent data. In one embodiment, the non-persistent data is ignored when the database is saved. The database is saved using a call to an API function such as the API function "MsiDatabaseCommit." Saving changes made to persistent data has no effect on the state of the temporary data or the persistent data loaded in memory. Both types of data remain integrated in memory. The lifetime of the temporary data is only as long as the table containing the temporary data is referenced by a view, unless the table is held in memory through the use of the keyword "HOLD." The temporary is data deleted from memory, along with the table containing persistent data loaded in memory, when there are no longer views referencing the table and when the table is not held via use of the "HOLD" keyword.

The particular methods performed by a non-persistent data management system of an exemplary embodiment of the invention have been described by reference to a flowchart. The non-persistent temporary entries can be added to any relational database (including databases designated as "read/write" as well as "read only") to manipulate data while maintaining the original state of the database. Using temporary entries is advantageous when a large amount of data already exists in a database and a user needs to enhance the data while still retaining the original state of the data.

Microsoft Windows Installer Implementation

In this section of the detailed description, a particular implementation of the invention is described that is part of a Microsoft Windows installer product available from Microsoft Corporation.

In the Microsoft Windows installer embodiment temporary entries are added to an installation database to manage a run-time state of a computer. The run-time state of the computer is a non-persistent state during the process of installing, upgrading or uninstalling software. Non-persistent temporary entries are added to data tables in the installation database. The installation database is used as a run-time data store. The temporary entries store the run-time state of a computer in rows and columns in the installation database, provide run-time properties, control logic flow of the installation process, and contain objects necessary for the installation process but which are not normally stored in the persistent database. The installation database collects and tracks information about the run-time state during the installation process and information about the progress of the installation. An example embodiment of such an installation database is further described in the co-filed and co-assigned U.S. patent application entitled "Use of Relational Databases for Software Installation"—Ser. No. 09/158,125 which is herein incorporated by reference.

In an example embodiment, each time an installation of a computer software product or component is preformed by a user, temporary columns are added to data tables in an installation database to represent a current state of a computer and a desired state of the computer after completion of the installation process. Data placed in the temporary columns is maintained only during the installation process. After the installation is complete, the data tables are released from memory and the temporary columns for the current state and the desired state that were added are not saved. All that remains in permanent storage of a user's computer is the permanent or persistent data contained in the data tables of the installation database. An example embodiment of a method for adding a temporary column to an installation database is described by the co-filed and co-assigned U.S. patent application entitled "Method for Optimizing the Installation of a Software Product onto a Target Computer System"—Ser. No. 09/157,853 which is herein incorporated by reference.

Conclusion

In previous systems, non-persistent data was not integrated with persistent data. Unlike previous systems, the non-persistent data management system of the present invention permits non-persistent data to be fully integrated with the persistent data. Interrelationships between the non-persistent data and the persistent data are allowed while the two types of data are integrated. The non-persistent data can be a temporary row or a temporary column, a temporary table or a temporary database with temporary tables. The lifetime of non-persistent data in a table is only as long as the table is referenced by any views associated with the table (unless the table is expressly held in memory beyond the lifetime of the views). The non-persistent data added to a table is lost when the table is no longer referenced by a view. Non-persistent data is ignored when a table loaded in memory is persisted (i.e. committed). Thus, the non-persistent data management system of the present invention permits new data to be added to a database in the form of temporary entries without requiring that the original state of the table be modified.

In one embodiment, an entire database containing persistent data is loaded into memory. Non-persistent data is integrated with the persistent data while the database is in memory. In an another embodiment, only the data tables that are in use are loaded into memory rather than the entire database of persistent data. The non-persistent data is a integrated with the persistent data while the tables exist in memory. In a further embodiment, the data tables that are in use are loaded on a separate computer readable medium (other than memory) that is never persisted. In each of these embodiments, the non-persistent data is integrated with the persistent data while the persistent data is in use; however, the non-persistent data is not preserve when persistent data is preserved.

A non-persistent data management system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A computerized method of managing integrated non-persistent data in a persistent database, the method comprising:
    creating an integrated entry in a persistent database;
    identifying the integrated entry as an entry containing non-persistent data; and
    ignoring the integrated entry when writing the persistent database to a computer readable medium to preserve the original state of the persistent database.

2. The method of claim 1, wherein the integrated entry is created as a column of a table in the persistent database.

3. The method of claim 2, wherein the integrated entry is identified by at least one bit in a schema for the table.

4. The method of claim 1, wherein the integrated entry is created as a row of a table in the persistent database.

5. The method of claim 4, wherein the integrated entry is identified by a reserved column in the table, the reserved column containing data identifying the row as containing non-persistent data.

6. The method of claim 1, wherein the integrated entry is created as a table in the persistent database.

7. A computerized system comprising:
    a relational database containing persistent data;
    a database engine for maintaining the relational database; and
    a database application program interface (API) having extensions for adding an entry containing non-persistent data to the relational database;
    wherein the database engine integrates the non-persistent data into the relational database with the persistent data while the database exists in memory of a computer and wherein the database engine ignores the non-persistent data in the relational database when writing the relational database to a computer readable medium so that an original state of the persistent data is preserved.

8. The system of claim 7, wherein the non-persistent data exists in the relational database in memory as long as a view is associated with a table containing the non-persistent data.

9. The system of claim 8, wherein the entry is added as a column of the table in the relational database.

10. The system of claim 8, wherein the entry is added as a row of the table in the relational database.

11. A computerized system comprising:
    a relational database containing persistent data;
    a means for maintaining the relational database;
    a means for adding an entry containing non-persistent data to the relational database; and
    a means for identifying the entry containing non-persistent data;
    wherein the means for maintaining the relational database integrates the non-persistent data into the relational database with the persistent data while the database exists in memory of a computer and wherein the means for maintaining the relational database removes the non-persistent data identified by the means for identifying when writing the relational database to a computer readable medium so that an original state of the persistent data is preserved.

12. The system of claim 11, wherein the entry is added as a column of a table in the relational database.

13. The system of claim 11, wherein the entry is added as a row of a table in the relational database.

14. A method of managing the run-time state of a computer, the method comprising:

creating a plurality of integrated entries in a persistent installation database, the integrated entries representing a run-time state of a computer;

identifying each one of the integrated entries as an entry containing non-persistent data; and ignoring the entries containing non-persistent data when writing the database to storage.

15. The method of claim 14, wherein at least one of the integrated entries indicates a software component is installed on a computer.

16. The method of claim 14, wherein the method is performed during the application installation process.

17. The method of claim 16, wherein one or more of the integrated entries tracks the progress of the installation.

18. The method of claim 16, wherein one or more of the integrated entries tracks a current state of the computer.

19. The method of claim 16, wherein one or more of the integrated entries tracks a desired state of the computer upon completion of the application installation process.

20. A computer readable medium having instructions stored thereon for causing a computer to perform a method of managing integrated non-persistent data in a persistent database, the method comprising:

creating an integrated entry in a persistent database;

identifying the integrated entry as an entry containing non-persistent data; and ignoring the integrated entry prior to saving the persistent database to a computer readable medium to preserve the original state of the persistent database.

21. The computer readable medium of claim 20, further comprising maintaining the integrated entry in memory as long as at least one view is associated with a table containing the entry.

22. A computer readable medium having instructions stored thereon for causing a computer to perform a method of managing the run-time state of a computer, the method comprising:

integrating a plurality of entries in a persistent installation database, the entries representing a run-time state of a computer;

identifying each one of the entries as an entry containing non-persistent data;

ignoring the entries containing non-persistent data when writing the database to storage.

23. The computer readable medium of claim 22, wherein at least one of the entries indicates a current state of software on the computer.

24. The computer readable medium of claim 22, wherein at least one of the entries indicates a desired state of software on the computer.

25. A computerized system comprising:

a database engine for managing a relational database containing persistent data;

an interface for specifying temporary data to be integrated into the relational database; and a module that modifies the database with the temporary data and identifies the temporary data as non-persistent data such that the non-persistent data is ignored when writing the database to permanent storage.

26. A database stored on a computer readable medium comprising:

a plurality of rows and columns of persistent data;

at least one entry of non-persistent data wherein the entry is a row or a column; and an indicator identifying the non-persistent data so that when writing the database to storage the non-persistent data is ignored.

27. A computerized method of managing non-persistent data in a relational database, the method comprising:

creating an entry in the relational database, the relational database being adapted to contain persistent data;

identifying the entry as an entry containing non-persistent data;

wherein the non-persistent data is integrated with any persistent data in the relational database; and ignoring the non-persistent data when writing the database to storage.

28. A computerized system comprising:

a relational database containing persistent data;

a database engine for maintaining the relational database;

wherein the database engine integrates the non-persistent data into the relational database with the persistent data; and ignoring the non-persistent data when writing the database to storage.

29. A database stored on a computer-readable medium comprising:

a plurality of rows and columns of persistent data;

at least one entry of non-persistent data wherein the entry is a row or a column;

wherein the non-persistent data is integrated with the persistent data; and wherein the non-persistent data is ignored when writing the database to storage.

* * * * *

UNITED STATES PATENT AND TRADEMARK OFFICE
CERTIFICATE OF CORRECTION

PATENT NO. : 6,714,935 B1
DATED : March 30, 2004
INVENTOR(S) : J.C. Delo

It is certified that error appears in the above-identified patent and that said Letters Patent is hereby corrected as shown below:

Column 1,
Line 17, "09/157,695." should read -- 09/657,695. --.

Column 2,
Line 8, "rows need" should read -- rows needs --.

Column 4,
Line 14, "components include" should read -- components including --.
Line 26, "25," should read -- 25. --.
Line 26, "a basic input/" should read -- A basic input/ --.
Line 35, "CD ROM" should read -- CD-ROM --.

Column 7,
Line 1, "nonpersistent" should read -- non-persistent --.
Line 22, "flow chart" should read -- flowchart --.
Line 28, "a entry" should read -- an entry --.
Line 52, "no longer reference" should read -- no longer referenced --.
Line 56, "release the" should read -- release of the --.

Column 8,
Line 2, "nonpersistent" should read -- non-persistent --.
Line 7, "specified, thus" should read -- specified; thus --.
Line 20, "nonpersistent" should read -- non-persistent --.
Line 38, "temporary is data" should read -- temporary data is data --.

Column 9,
Line 57, "In an another" should read -- in another --.
Line 59, "is a" should read -- is --.
Line 66, "not preserve" should read -- not preserved --.

Column 11,
Line 14, "identifying each one" should read -- identifying, with an indicator, each one --.
Line 16, "ignoring the entries" should read -- ignoring the indicated entries --.
Line 17, "to storage." should read -- to storage to preserve the original state of the persistent installation database. --.
Line 52, "identifying each one" should read -- identifying, with an indicator, each one --.

UNITED STATES PATENT AND TRADEMARK OFFICE
CERTIFICATE OF CORRECTION

PATENT NO.    : 6,714,935 B1
DATED         : March 30, 2004
INVENTOR(S)   : J.C. Delo It is certified that error appears in the above-identified patent and that said Letters Patent is hereby corrected as shown below:

Column 11 (cont'd),
Line 53, "non-persistent data;" should read -- non-persistent data; and --.
Line 55, "ignoring the entries" should read -- ignoring the identified entries --.
Line 56, "to storage." should read -- to storage to preserve the original state of the persistent installation data. --.

Column 12,
Line 29, "identifying the entry" should read -- identifying, with an indicator, the entry --.
Line 35, "to storage." should read -- to storage to preserve the original state of the relational database. --.
Line 41, "data into the relational" should read -- data, identified with an indicator, into the relational --.
Line 43, "ignoring the non-persistent data" should read -- ignoring the indicated non-persistent data --.
Line 44, "to storage." should read -- to storage to preserve the original state of the relational database. --.
Line 51, "non-persistent data is integrated" should read -- non-persistent data, identified with an indicator, is integrated --.
Line 53, "the non-persistent data" should read -- the indicated non-persistent data --.
Line 55, "to storage." should read -- to storage of the original persistent data. --.

Signed and Sealed this

Eighteenth Day of April, 2006

JON W. DUDAS
*Director of the United States Patent and Trademark Office*